(12) United States Patent
Szczepanik et al.

(10) Patent No.: US 11,392,303 B2
(45) Date of Patent: Jul. 19, 2022

(54) METERING COMPUTING POWER IN MEMORY SUBSYSTEMS

(71) Applicant: International Business Machines Corporation, Armonk, NY (US)

(72) Inventors: Grzegorz Piotr Szczepanik, Cracow (PL); Vinod A. Valecha, Pune (IN); Lukasz Jakub Palus, Cracow (PL); Krzysztof Rudek, Nowy Wisnicz (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/017,753

(22) Filed: Sep. 11, 2020

(65) Prior Publication Data
US 2022/0083242 A1 Mar. 17, 2022

(51) Int. Cl.
*G06F 3/06* (2006.01)
*G06F 1/26* (2006.01)

(52) U.S. Cl.
CPC .............. *G06F 3/0625* (2013.01); *G06F 1/26* (2013.01); *G06F 3/0653* (2013.01); *G06F 3/0673* (2013.01)

(58) Field of Classification Search
CPC .... G06F 3/0625; G06F 3/0653; G06F 3/0673; G06F 1/26
USPC ......................................................... 711/154
See application file for complete search history.

(56) References Cited

U.S. PATENT DOCUMENTS

| | | | |
|---|---|---|---|
| 7,421,598 B2 | 9/2008 | Brittain et al. | |
| 9,547,027 B2 | 1/2017 | Varma et al. | |
| 9,577,829 B1* | 2/2017 | Roth | H04L 9/3236 |
| 11,048,650 B1* | 6/2021 | Tang | G06F 1/10 |
| 2017/0031976 A1* | 2/2017 | Chavan | G06F 16/23 |
| 2017/0364534 A1* | 12/2017 | Zhang | G06N 5/04 |
| 2018/0374109 A1* | 12/2018 | Scarpati | G06N 7/00 |
| 2019/0057050 A1* | 2/2019 | Mathuriya | G06N 3/063 |
| 2019/0205273 A1* | 7/2019 | Kavali | H01L 23/5226 |
| 2019/0235774 A1* | 8/2019 | Benisty | G06F 1/3275 |
| 2019/0317949 A1* | 10/2019 | Florissi | G06F 16/27 |
| 2020/0218629 A1* | 7/2020 | Chen | G06F 11/3447 |
| 2020/0388330 A1* | 12/2020 | Grover | H01L 27/1104 |
| 2021/0117339 A1* | 4/2021 | Wang | G06F 3/067 |
| 2021/0295145 A1* | 9/2021 | Bayat | G06N 3/04 |

OTHER PUBLICATIONS

Website, UP mem, https://www.upmem.com, printed Jul. 15, 2020, 7 pages.
Desrochers et al., "A Validation of DRAM RAPL Power Measurements", MEMSYS Oct. 3-6, 2016, 2016, Washington, DC, USA, 16 pages.

(Continued)

*Primary Examiner* — Christopher B Shin
(74) *Attorney, Agent, or Firm* — Nathan M. Ran (57) ABSTRACT

A scanner is used to generate a set of processing power consumption metrics for a memory subsystem. From the set of processing power consumption metrics, a number of in-memory computations is determined. From the number of in-memory computations, a total computing score is determined. A user is notified of the total computing score.

10 Claims, 6 Drawing Sheets

(56) References Cited

OTHER PUBLICATIONS

Zois et al., "Massively Parallel Skyline Computation For Processing-In-Memory Architectures", PACT '18, Nov. 1-4, 2018, Limassol, Cyprus, © 2018 Association for Computing Machinery, 12 pages.

Morgan, "Accelerating Compute by Cramming It Into DRAM Memory", The Next Platform, Oct. 3, 2019, 13 pages. https://www.nextplatform.com/2019/10/03/accelerating-compute-by-cramming-it-into-dram/.

Subramaniam et al., "Towards Energy-Proportional Computing Using Subsystem-Level Power Management", Department of Computer Science, Virginia Tech, arXiv:1501.02724v1 [cs.DC] Jan. 12, 2015, 14 pages.

Liu et al., "DReAM: Per-Task DRAM Energy Metering in Multicore Systems", Euro-Par 2014, LNCS 8632, 2014, Copyright Springer International Publishing Switzerland 2014, 13 pages.

Mell et al., "The NIST Definition of Cloud Computing", Recommendations of the National Institute of Standards and Technology, U.S. Department of Commerce, Sep. 2011, 7 pages.

\* cited by examiner

FIG. 6

METERING COMPUTING POWER IN MEMORY SUBSYSTEMS

BACKGROUND

The present disclosure relates generally to the field of computer resource metering, and more particularly to the metering of computing power in memory subsystems.

Metering of computing power is required in cloud computing environments to properly monitor, assess, and bill for resources consumed. In elastic environments where scaling resource pools up and/or down is desirable, metering can be used to determine when, and by how much, a resource pool should be adjusted. Traditional metering methods focus on processor usage to determine and report resource consumption.

SUMMARY

Embodiments of the present disclosure include a method, computer program product, and system for metering computing power within a memory subsystem.

A scanner is used to generate a set of processing power consumption metrics for a memory subsystem. From the set of processing power consumption metrics, a number of in-memory computations is determined. From the number of in-memory computations, a total computing score is determined. A user is notified of the total computing score.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computer resource metering, and more particularly to the metering of computing power in memory subsystems. While the present disclosure is not necessarily limited to such applications, various aspects of the disclosure may be appreciated through a discussion of various examples using this context.

Metering of computing power is a crucial task for allowing software vendors to set up fair licensing prices and avoid overcharging/undercharging for licensed components/software/resources. Traditional solutions in this area are highly focused on using the consumption of computer processor unit (CPU) resources as the sole means for determining price points and licensing fees.

Recent developments in computing technologies have introduced the need for a more comprehensive method for determining fair pricing models. For example, processing elements are beginning to be incorporated into memory subsystems; such memory may be referred to as Processing in Memory (PIM). PIM may incorporate a processing element into, for example, a dual in-line memory module (DIMM), such as a stick of dynamic random access memory (DRAM). In such embodiments, it would be possible to perform at least a subset of computing operations without accessing the CPU at all. At the same time, it may differ from processing done on specialized cards (e.g., graphics processing units (GPU) or field programmable gate array (FPGA) accelerators) as it does not require the transfer of data outside of the DIMM. Therefore, in order to achieve an accurate measurement of computing resources consumed, the resources consumed within a PIM-enabled memory subsystem would need to be measured and reported, in addition to any resources consumed at the CPU or other specialized card, such as a GPU or FPGA accelerator.

Embodiments of the present disclosure contemplate a mechanism whereby the number of in-memory computations may be counted and factored into a determination of the amount of computing resources consumed. For example, a scanning component may be used to poll the data processing unit(s) (DPU) within the PIM to receive information regarding the number of computations performed, as well as any other relevant consumption metrics (e.g., wattage consumed, heat generated, length of time engaged, etc.)

In embodiments, the scanning component may utilize an application programming interface (API) to communicate with a software developer kit (SDK) provided by a PIM vendor. In some embodiments, the SDK enables deployment of the PIM functionality, and the scanner may use the API to poll, via the SDK, the DPU(s) within the DIMM(s) to determine the number of computations processed by each DPU, as well as any other consumption metrics.

In some embodiments, the number of computations and other consumption metrics may be combined into a total computing score reflecting the amount of consumption performed within the memory subsystem. In other words, the total computing score may correlate to the cost for processing a computing payload. In yet other embodiments, the total computing score may be combined with further factors/metrics, such as CPU/GPU/FPGA accelerator consumption metrics, to generate a composite total computing score.

In some embodiments, each factor/metric may be weighted according to, for example, wattage consumed, heat generated, length of time engaged in a computation, peak usage time(s), resource type availability/scarcity, etc.

Figure 1:
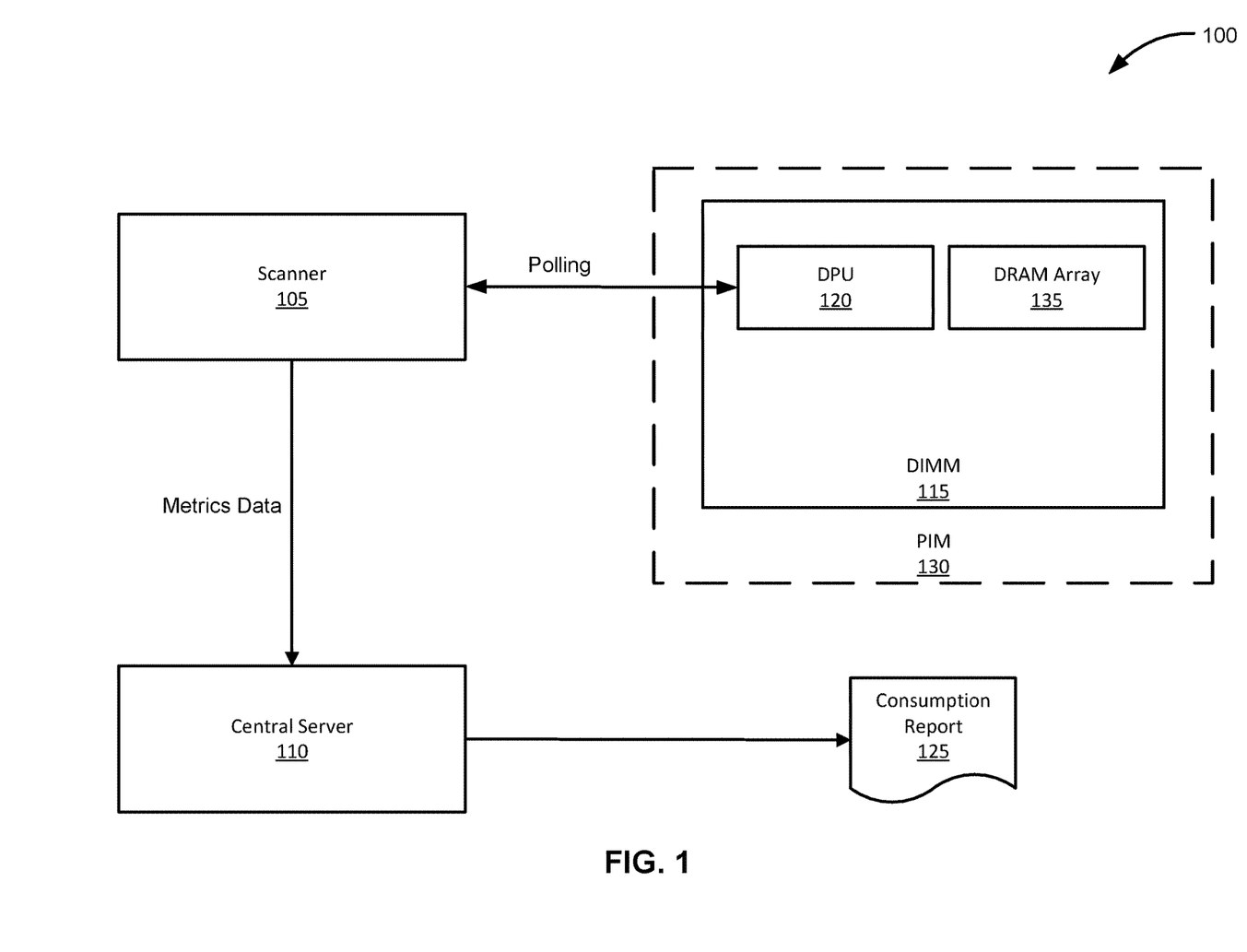
FIG. 1 illustrates an example computing environment for metering computing power in memory subsystems, in accordance with embodiments of the present disclosure.

Referring now to FIG. 1, illustrated is an example computing environment 100 for metering computing power in memory subsystems, in accordance with embodiments of the present disclosure. In some embodiments, example computing environment 100 may include scanner 105, central server 110, PIM 130, and consumption report 125.

PIM 130 may include one or more DIMMs 115 within a memory subsystem. In some embodiments, the DIMM 115 may be of DRAM type. In such embodiments, DPU 120 may use a pipeline (not shown) communicatively coupled to DRAM array 135 via direct memory access (DMA) to allow processing within a memory subsystem, without communication with a CPU. In this way, PIM 130 facilitates computations and processing functions without necessarily incorporating a main CPU of a computer system.

In some embodiments, scanner 105 may include software for the discovery and monitoring of one or more DPU(s) 120. In some embodiments, scanner 105 may utilize an SDK provided by a service provider or vendor (e.g., a cloud computing resource licensor), which may allow a computing system to utilize the DPU(s) 120 for data processing. In some embodiments, the scanner may utilize a poll API to query the DPU(s) 120 and receive back information regarding the number of in-memory computations performed over a particular time period, as well as any relevant processing power consumption metrics.

In some embodiments, the scanner 105 may be local to a particular hypervisor or virtual machine, or it may reside on a central server 110. Central server 110 may receive, from scanner 105, the number of in-memory computations and the processing power consumption metrics to determine a total computing score for the particular time period when the PIM 130 was monitored by the scanner 105. The total computing score may be calculated as a matrix or array of values, as an average of resource consumption, for example. In some embodiments, particular features (e.g., certain values within the matrix) may be weighted according to vendor preference.

In some embodiments, central server 110 may receive additional information, such as CPU resource consumption or other metrics as described herein. Central server 110 may combine the total computing score with this additional information or metrics to generate a composite total computing score, in some embodiments.

Consumption report 125 may include, in some embodiments, a total computing score and/or a composite total computing score for one or more PIM(s) 130. In some embodiments, a user may obtain a license for multiple virtual machines or resource pools, and the consumption report 125 may reflect the total computing score and/or composite total computing score for each virtual machine and/or memory subsystem associated with the virtual machine or resource pool. In this way, an accurate accounting of consumed resources may be generated for a computing system or virtual machine utilizing one or more PIM(s) 130.

Figure 2:
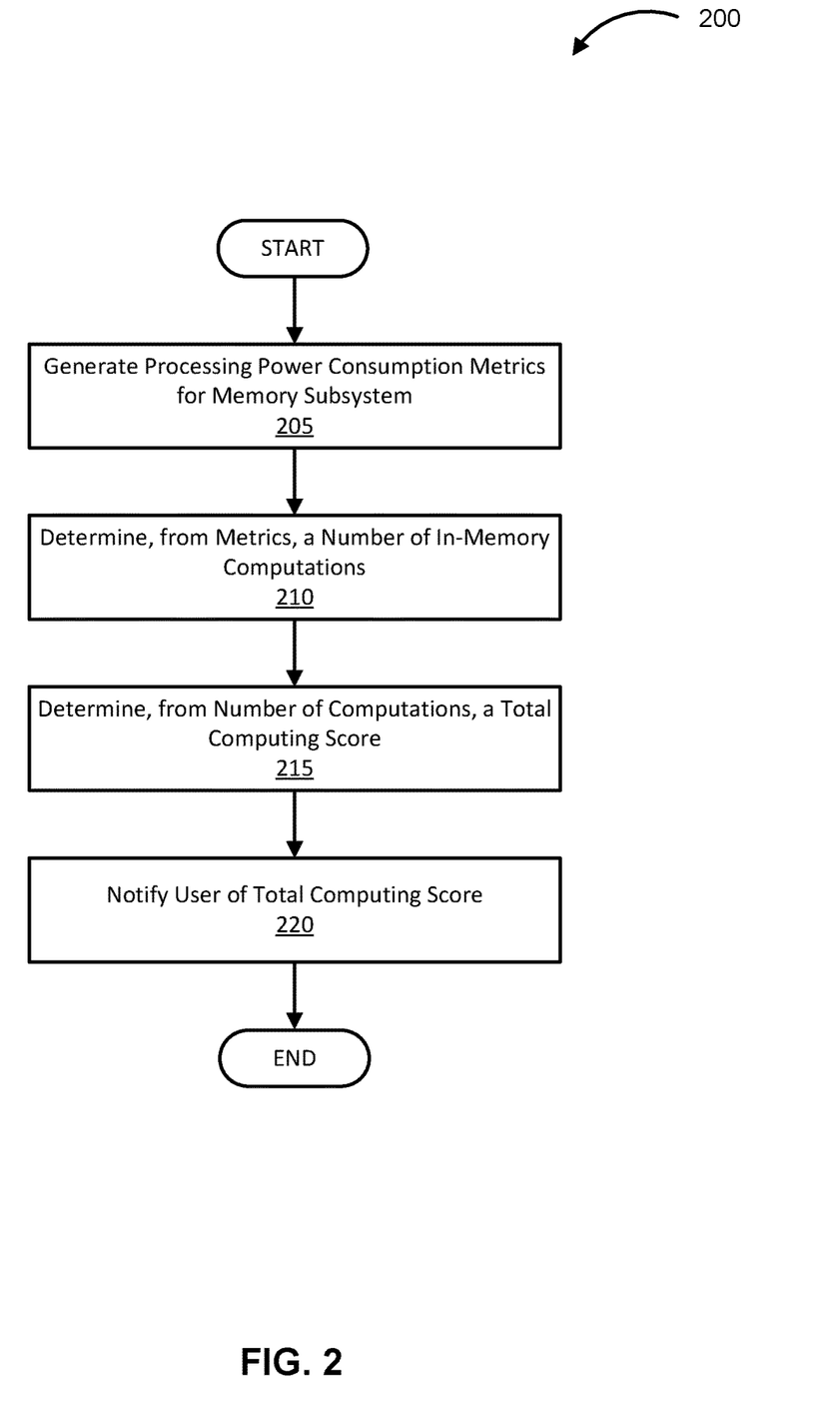
FIG. 2 illustrates an example method for metering computing power in memory subsystems, in accordance with embodiments of the present disclosure.

Turning now to FIG. 2, illustrated is a flowchart of an example method 200 for metering computing power in memory subsystems, in accordance with embodiments of the present disclosure. Method 200 may begin at 205, where a set of processing power consumption metrics is generated for a memory subsystem, as described herein. In some embodiments, the processing power consumption metrics may include a number of in-memory computations within one or more PIMs, or it may include information from which the number of in-memory computations may be inferred or derived.

At 210, it may be determined, from the processing power consumption metrics, the number of in-memory computations. In some embodiments, this may include deriving the number of in-memory computations from a set of logic instructions (e.g., NAND, NOR, ORN, ANDN, NXOR operations).

At 215, it may be determined, from the number of in-memory computations, a total computing score. In some embodiments, the total computing score may reflect the computing resources consumed within the memory subsystem over a given time period. In some embodiments, the total computing score may be used to determine at least a portion of licensing fees or metering data for a particular virtual machine.

At 220, a user is notified of the total computing score. In some embodiments, this may include notifying a licensor of the total computing score in order to prepare an invoice for a licensee, or, in other embodiments, it may include notifying the licensee of the total computing score directly. In yet other embodiments, both the licensor and licensee may both be notified of the total computing score.

Figure 3:
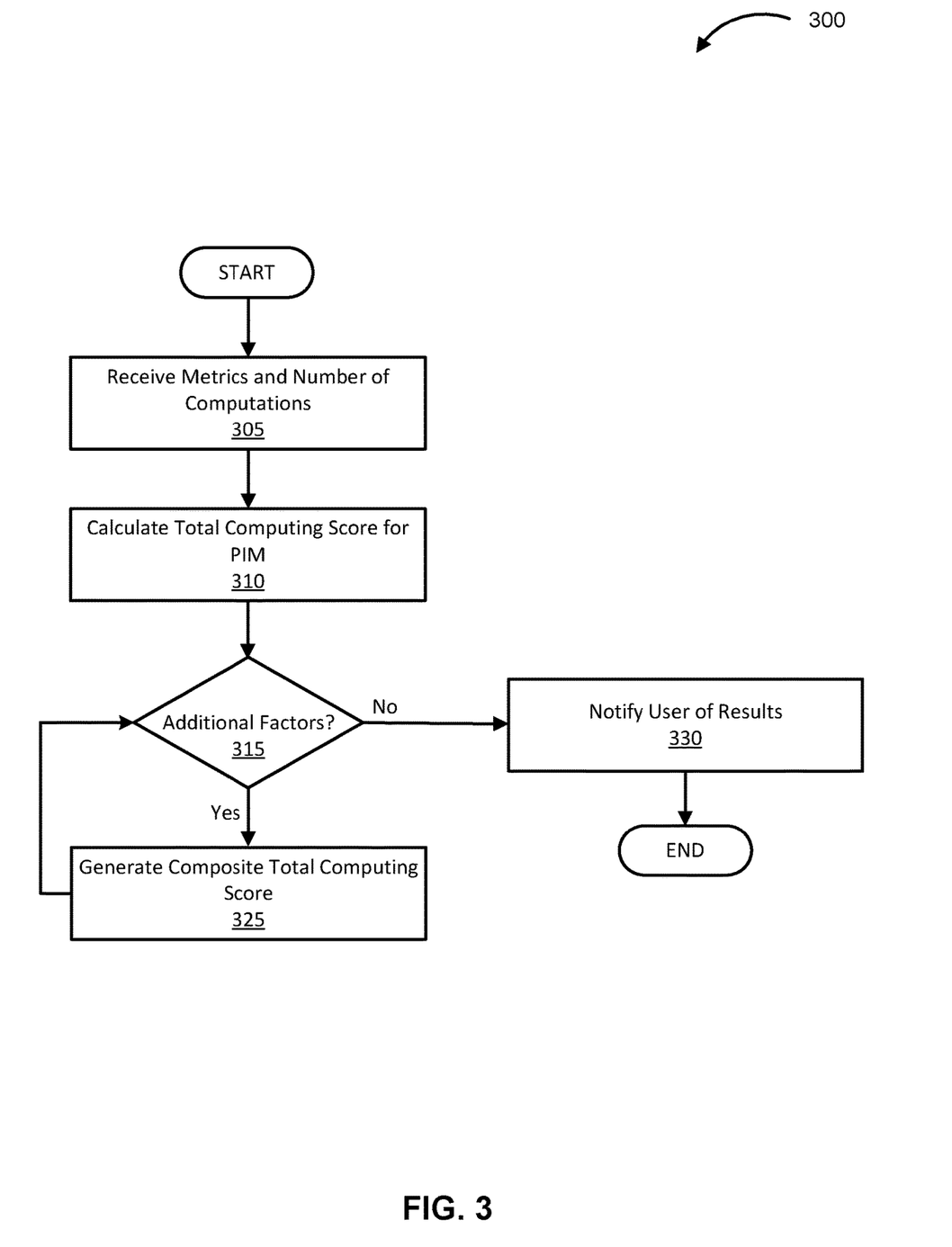
FIG. 3 illustrates an example method for generating a composite total computing score, in accordance with embodiments of the present disclosure.

Turning now to FIG. 3, illustrated is a flowchart of an example method 300 for generating a composite total computing score, in accordance with embodiments of the present disclosure. Method 300 may begin at 305, where a set of processing power consumption metrics and the number of in-memory computations is received (e.g., at central server 110), as described herein.

At 310, the metrics and number of in-memory computations is used to calculate a total computing score for the PIM(s) from which the metrics and computations were polled, as described herein.

At 315, it is determined whether there are additional factors and/or features that should be taken into account. This may include checking the number of virtual machines, hypervisors, or other computing resources/pools associated with a particular user against the received metrics and computations to determine whether all relevant information has been received.

If, at 315, it is determined there are additional factors that should be considered, those additional factors are used, in conjunction with the received metrics and computations from 305 and/or total computing score from 310, to generate a composite total computing score at 325, as described herein. This may include weighting and/or discounting one or more factors/features, as described herein.

If, at 315, it is determined that no additional factors remain, the user may be notified of the results at 330. In some embodiments, the results may include a total computing score for a single PIM, or it may include a composite total computing score for multiple PIMs, or one or more PIMs in conjunction with additional computing resources (e.g., CPU/GPU/FPGA accelerator) factored into the score.

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
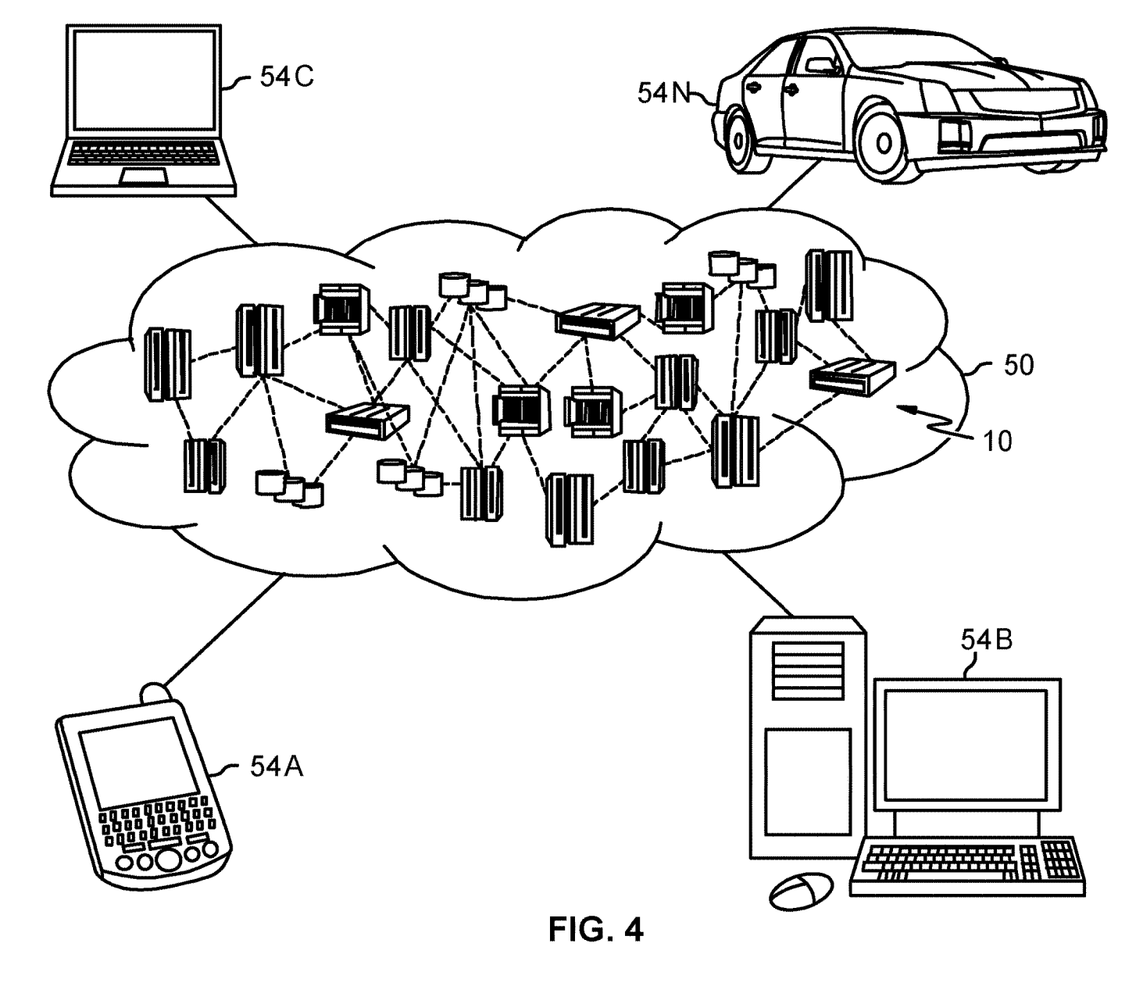
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
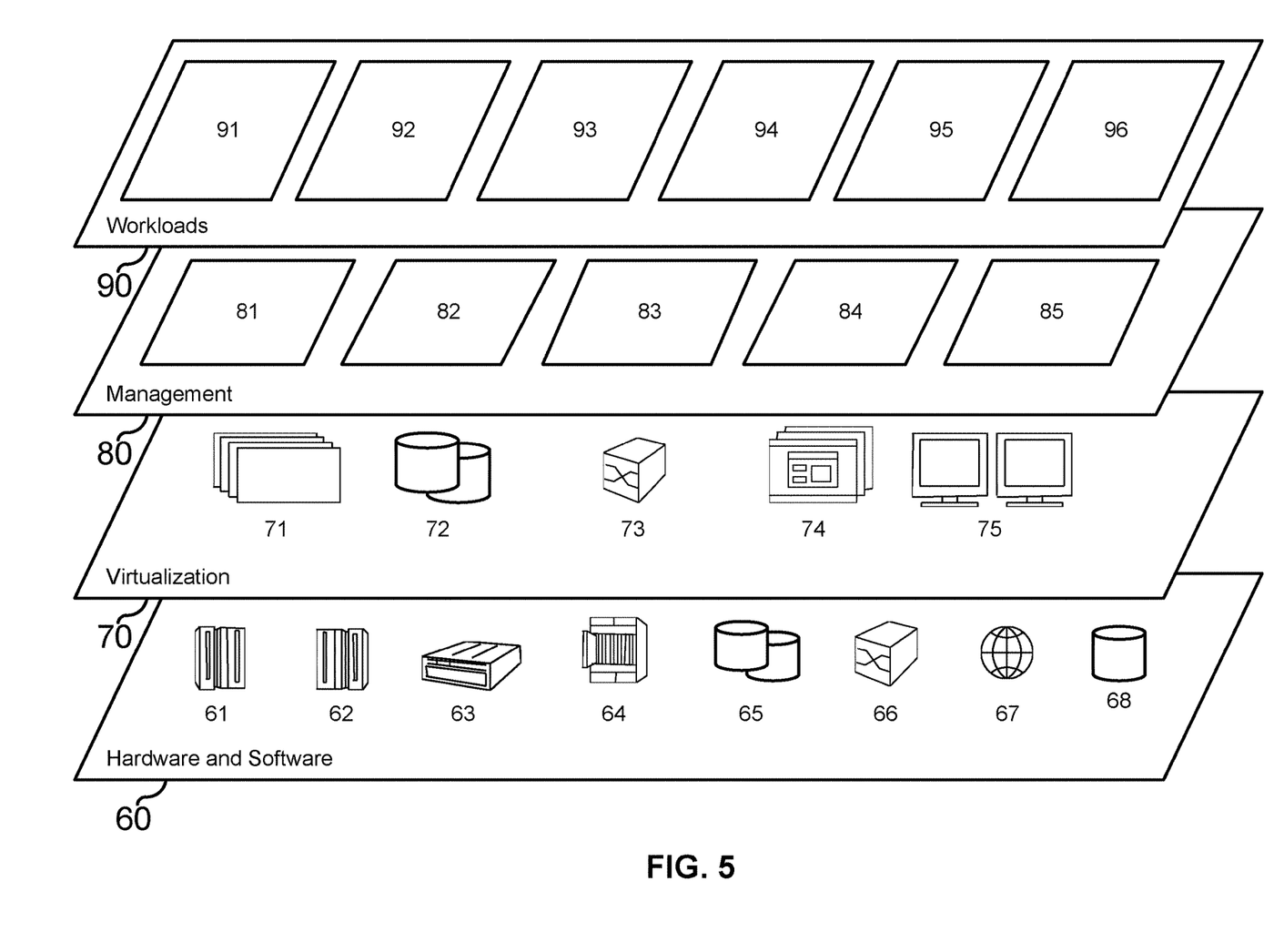
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and metering of computing power in memory subsystems 96.

Figure 6:
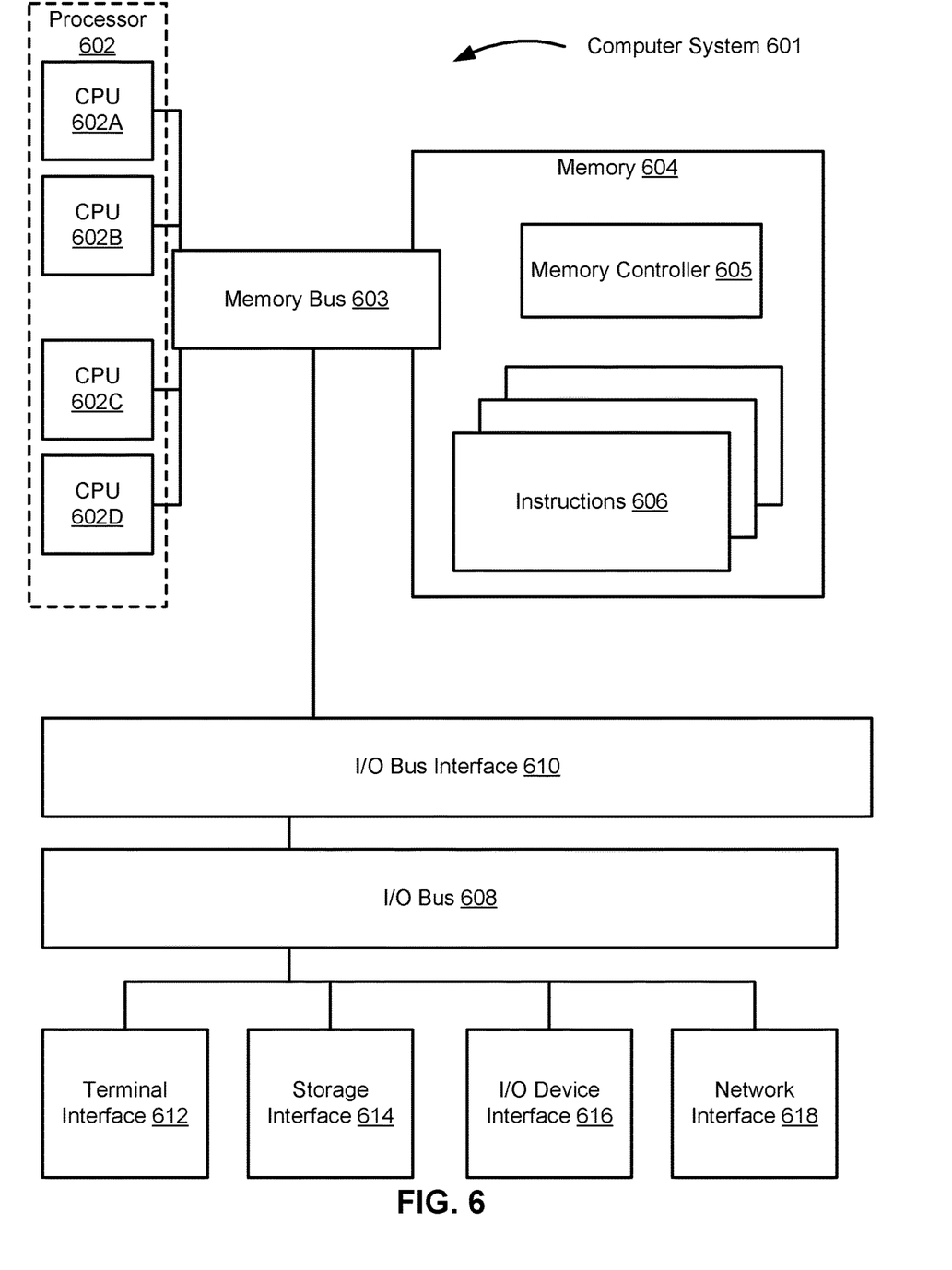
FIG. 6 depicts a high-level block diagram of an example computer system that may be used in implementing embodiments of the present disclosure.

Referring now to FIG. 6, shown is a high-level block diagram of an example computer system 601 that may be configured to perform various aspects of the present disclosure, including, for example, methods 200/300, described in FIGS. 2 and 3. The example computer system 601 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 601 comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache. Memory subsystem 604 may include instructions 606 which, when executed by processor 602, cause processor 602 to perform some or all of the functionality described above with respect to FIGS. 2-3.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601 and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative example components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for metering computing power, comprising:
a scanner configured to discover and monitor one or more data processing units to obtain information related to a number of in-memory computations performed over a period of time, and at least one processing power consumption metric;
a central server configured to receive from the scanner the number of in-memory computations and the at least one processing power consumption metric, and to determine a total computing score for the time period based upon the received information from the scanner; and
a processor configured to generate a consumption report for the one or more data processing units, the consumption report including the computed total computing score, the consumption report indicative of a total amount of computing resources consumed by the one or more data processing units.

2. The system of claim 1 wherein the central server is configured to receive additional information related to resource consumption of the one or more data processing units.

3. The system of claim 1 wherein the scanner is configured to poll via an application programming interface (API) the one or more data processing units.

4. The system of claim 1 wherein the scanner is local to a hypervisor associated with the one or more data processing units.

5. The system of claim 1 wherein the number of in-memory computations includes processing occurring in the memory system without communication with a central processing unit.

6. A method for metering computing power, comprising:
   discovering, by a scanner, one or more data processing units
   monitoring, by the scanner, the one or more data processing units;
   obtaining information related to a number of in-memory computations performed over a period of time, and at least one processing power consumption metric;
   receiving from the scanner at a central server the number of in-memory computations and the at least one processing power consumption metric,
   determining, by the central server, a total computing score for the time period based upon the information received from the scanner; and
   generating, by a processor, a consumption report for the one or more data processing units, the consumption report including the computed total computing score, the consumption report indicative of a total amount of computing resources consumed by the one or more data processing units.

7. The method of claim 6 further comprising:
   receiving, by the central server, additional information related to resource consumption of the one or more data processing units.

8. The method of claim 6 further comprising:
   polling, by the scanner via an application programming interface (API), the one or more data processing units.

9. The method of claim 6 wherein the scanner is local to a hypervisor associated with the one or more data processing units.

10. The method of claim 6 wherein the number of in-memory computations includes processing occurring in the memory system without communication with a central processing unit.

* * * * *